(12) United States Patent
Pomirleanu et al.

(10) Patent No.: US 9,478,320 B2
(45) Date of Patent: Oct. 25, 2016

(54) METHOD FOR IN-CORE INSTRUMENTATION WITHDRAWAL FROM THE CORE OF A PRESSURIZED WATER REACTOR

(71) Applicant: Westinghouse Electric Company LLC, Cranberry Township, PA (US)

(72) Inventors: Radu O. Pomirleanu, Sewickley, PA (US); Alexander W. Harkness, Gibsonia, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 576 days.

(21) Appl. No.: 14/461,555

(22) Filed: Aug. 18, 2014

(65) Prior Publication Data

US 2016/0049212 A1 Feb. 18, 2016

(51) Int. Cl.
| | | |
|---|---|---|
| G21C 19/19 | (2006.01) | |
| G21C 13/02 | (2006.01) | |
| G21C 19/20 | (2006.01) | |
| G21C 1/32 | (2006.01) | |

(52) U.S. Cl.
CPC ............... *G21C 19/19* (2013.01); *G21C 13/02* (2013.01); *G21C 19/205* (2013.01); *G21C 1/322* (2013.01); *Y02E 30/40* (2013.01)

(58) Field of Classification Search
CPC .... G21C 19/19; G21C 19/205; G21C 13/02; G21C 1/322
USPC .......... 376/261, 263, 264, 271, 254
See application file for complete search history.

(56) References Cited

U.S. PATENT DOCUMENTS

| | | | |
|---|---|---|---|
| 5,057,270 A | 10/1991 | Chevereau | |
| 8,121,243 B2* | 2/2012 | Yonemoto | G21C 19/02 376/254 |
| 8,958,519 B2* | 2/2015 | Whitten | G21C 19/207 376/245 |
| 9,064,607 B2* | 6/2015 | Harkness | G21C 19/10 376/263 |
| 2008/0253497 A1 | 10/2008 | Singleton et al. | |
| 2010/0150294 A1* | 6/2010 | Weisel | G21C 19/02 376/263 |
| 2013/0287157 A1* | 10/2013 | Conway | G21C 13/028 376/203 |
| 2013/0336439 A1* | 12/2013 | Isono | G21C 19/20 376/254 |
| 2014/0198891 A1 | 7/2014 | Harkness | |
| 2014/0307843 A1* | 10/2014 | Margotta | G21C 19/19 376/259 |

FOREIGN PATENT DOCUMENTS

| | | |
|---|---|---|
| JP | 2007171157 | 7/2007 |
| WO | WO2012117779 | 9/2012 |

OTHER PUBLICATIONS

Westinghouse Electric Company LLC, PCT /US2015/035025 Search Report, Oct. 23, 2015, 8 pages.

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A method of removing the upper internals assembly from a nuclear reactor pressure vessel for refueling that simultaneously disconnects two or more of the in-core instrument thimble assemblies from the reactor vessel penetrations through which their signal cables extend. The signal cables are connected to the penetrations with an electrical connector that supports the two or more in-core instrumentation thimble assembly signal leads. Before the electrical connector is disconnected, water in the vessel is lowered below the connection so that the process is performed in a dry environment.

7 Claims, 10 Drawing Sheets

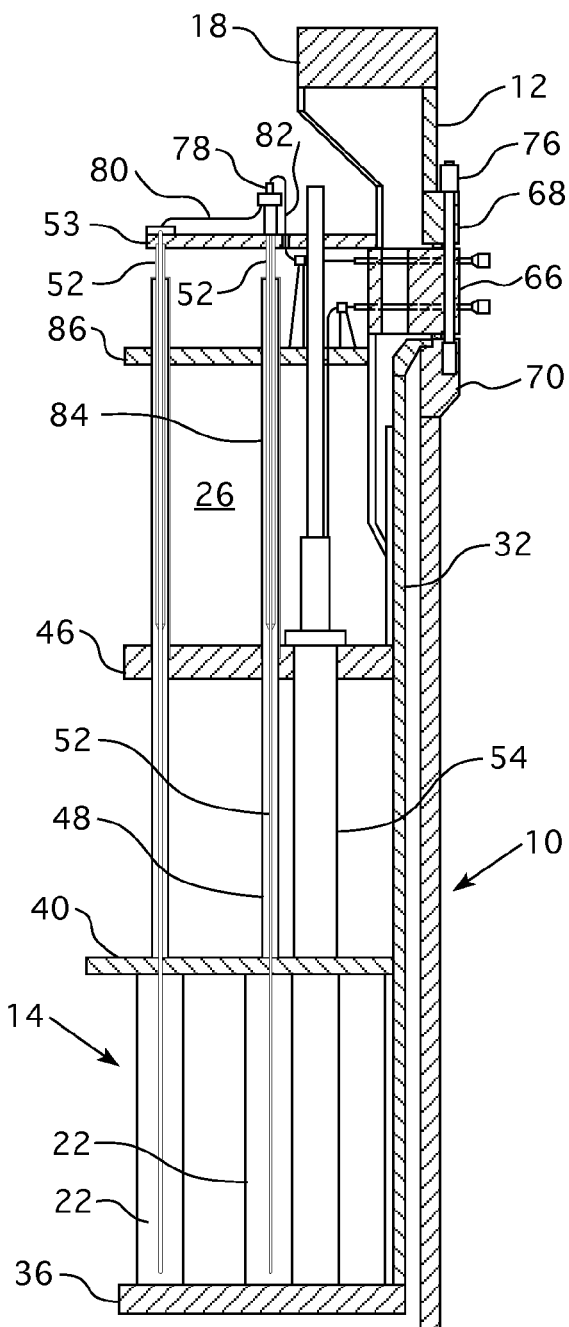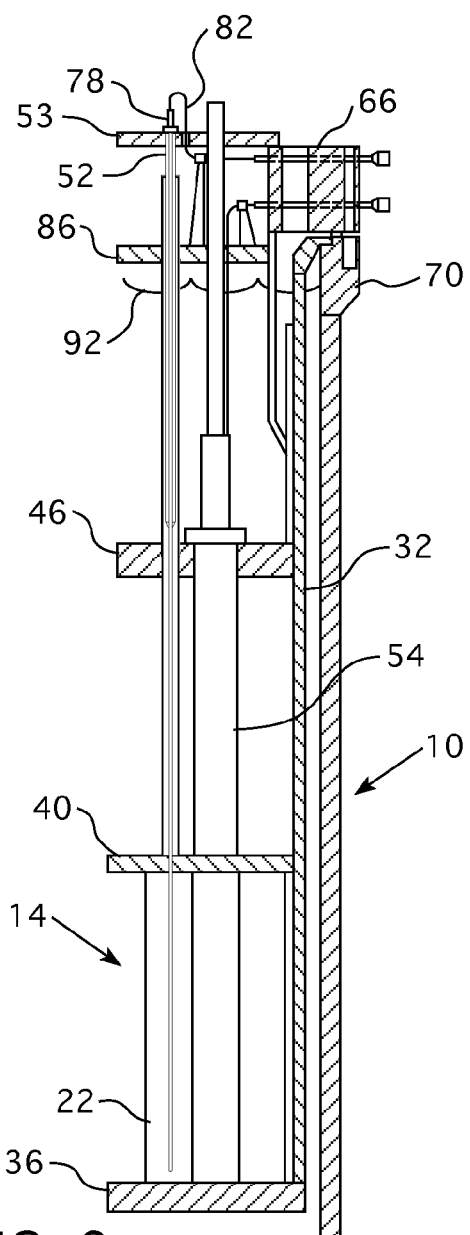

METHOD FOR IN-CORE INSTRUMENTATION WITHDRAWAL FROM THE CORE OF A PRESSURIZED WATER REACTOR

BACKGROUND

1. Field

This invention relates in general to nuclear reactor systems, and, in particular, to in-core instrumentation for such systems, that pass through the upper internals of the reactor pressure vessel.

2. Related Art

In a nuclear reactor for power generation, such as a pressurized water reactor, heat is generated by fission of a nuclear fuel such as enriched uranium, and transferred to a coolant flowing through a reactor core. The core contains elongated nuclear fuel rods mounted in proximity with one another in a fuel assembly structure, through and over which coolant flows. The fuel rods are spaced from one another in co-extensive parallel arrays. Some of the neutrons and other atomic particles released during nuclear decay of the fuel atoms in a given fuel rod pass through the spaces between the fuel rods and impinge on the fissile material in adjacent fuel rods, contributing to the nuclear reaction and to the heat generated by the core.

Movable control rods are dispersed through the core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed; and retracting the control rod reduces the extent of neutron absorption and increases the rate of the nuclear reaction and the power output of the core.

To monitor the neutron activities and coolant temperature within the core fuel assemblies, moveable in-core instrumentation has been employed in the past, such as moveable neutron detectors, that conventionally enter the core from penetrations in the bottom of the vessel. Additionally, fixed in-core neutron detectors have been employed that enter the core through the bottom of the reactor vessel and reside in the fuel assemblies during normal operation. In addition to fixed in-core instrumentation that enter through penetrations in the bottom of the vessel, there are fixed in-core instrumentation that enter through penetrations in the top of the vessel. In a few instances in the past, leakage occurred at the penetrations at the bottom of the vessel which presented significant repair problems. It soon became apparent that it would be desirable to have all the in-core instrumentation access the core from above. In this latter configuration, each in-core instrument thimble assembly is totally enclosed in a guide path composed of tubing which extends axially through the upper internals. The lower portion of this guide path extends down into the instrumentation thimbles within the fuel assemblies. However, even the fixed in-core neutron detectors, and the thermocouple assemblies that are used to monitor temperature within the core, have to be withdrawn from the fuel assemblies before the reactor core can be accessed for refueling operations. Thus, it is therefore necessary to provide a structure which can satisfactorily guide and protect the in-core instrumentation entering from the top of the vessel and mitigate the potential for leakage while enabling access for refueling.

These objectives have become even more of a challenge for some small modular reactor designs such as the one being proposed by Westinghouse Electric Company LLC, Cranberry Township, Pa., in the 200 megawatt class. The small modular reactor is an integral pressurized water reactor with all primary loop components located inside the reactor vessel. The reactor vessel is surrounded by a compact high pressure containment. Due to both the limited space within the containment and the low cost requirement for integral pressurized light water reactors, the overall number of auxiliary systems needs to be minimized without compromising safety or functionality. For example, the compact, high pressure containment associated with the design of small modular reactors does not allow for the incorporation of a large floodable cavity above the reactor vessel in which the transferred components can be shielded. Furthermore, in most traditional pressurized water reactors, the in-core instrumentation is retracted from the core prior to refueling. This is done by breaking primary pressure boundary seals and pulling the instrumentation through a conduit tube. This procedure is straightforward in plants with bottom mounted instrumentation since the conduit just extends from the bottom of the reactor vessel to a seal table located in a room separated from the reactor. In plants with top mounted instrumentation, this procedure is much more challenging because of the upper internal structure. This is further complicated when top mounted instrumentation is considered for use in an integral pressurized water reactor of a small modular reactor system that has a heat exchanger and pressurizer integrally incorporated in the reactor head closure. Top mounted instrumentation is preferred in plants that use a severe accident mitigation strategy commonly referred to as in-vessel retention. This strategy requires that there are no penetrations in the lower portion of the reactor vessel.

U.S. patent application Ser. No. 13/457,683, filed Apr. 27, 2012, entitled "Instrumentation and Control Penetration Flange for a Pressurized Water Reactor," assigned to the Assignee of this Application, introduced a removable annular seal ring between the reactor head closure and the pressure vessel flange for routing cabling from the control rod drives and core monitoring instrumentation through the reactor vessel pressure barrier. U.S. patent application Ser. No. 13/742,392, filed Jan. 16, 2013, entitled "Method and Apparatus for Refueling a Nuclear Reactor Having an Instrumentation Penetration Flange," assigned to the Assignee of this Application, teaches one method of refueling such a reactor. Refueling is on the critical path of most outages in which it is a part and any means of making the method of refueling more efficient can substantially reduce the cost of such an operation to utility operators. Accordingly, further improvements in reducing the steps that have to be taken to remove the instrumentation from the core so that they can be removed with the upper internals and expose the fuel assemblies is desirable for both conventional reactors and integral modular reactors.

In conventional reactors, the in-core instruments are encased in a long stainless steel tube, referred to an outer sheath, typically 30 to 40 feet (9.1 to 12.2 meters) long and approximately ⅜ of an inch (9.5 millimeters) in diameter. The outer sheath contains the instruments and the instrument leads. These lead wires extend the full length of the instrument and are terminated at one end in an electrical connector. The assembly of the instruments, instrument lead wires, outer sheath and electrical connector is called an in-core instrument thimble assembly. In the reactor, the end of the in-core instrument thimble assembly that has detectors in it, extends from the top of the fuel assembly, to almost the bottom, a distance in a conventional assembly of typically between 10 and 12 feet (3.05-3.66 meters). The non-active end of the in-core instrument thimble assembly contains lead wires that transmit the signal from the detectors to an electrical connector. In existing applications, the outer sheath of the in-core instrument thimble assembly passes through a vessel penetration. In more recent designs the penetration is usually in the reactor vessel's closure head, and the electrical connector is located outside of the reactor.

During a reactor refueling the in-core instrument thimble assemblies must be removed from the core to allow fuel repositioning. Some plant designs have an instrumentation grid assembly plate inside the reactor on an upper portion of the upper internals to which all of the in-core instrument thimble assemblies are attached. During the refueling, the instrumentation grid assembly plate is lifted and all of the in-core instrument thimble assemblies are withdrawn simultaneously from the reactor core. Other plants, that do not have an instrumentation grid assembly plate, withdraw each in-core instrument thimble assembly individually a sufficient distance to allow fuel movement. The withdrawn portion of the in-core instrument thimble assembly must be supported by an external means. Any change in structure of the in-core instrument thimble assemblies or the upper internals that will reduce the number of steps required to withdraw the in-core instrument thimble assemblies from the core will reduce the critical path refueling time and minimize the possibility of damaging the in-core instrument thimble assemblies due to a mishandling error. This is especially true in the crowded environment of a small, integral modular reactor.

According, it is an object of this invention to modify the in-core instrument thimble assemblies in a way that will minimize the number of steps required to withdraw the in-core instrument thimble assemblies into the upper internals and remove the upper internals from above the reactor core.

It is a further object of this invention to provide such a modification that will minimize the number of times submerged electrical connectors need to be disassembled.

SUMMARY

These and other objects are achieved by a method of refueling a pressurized water nuclear reactor having a pressure vessel with an upper removable head for sealably engaging an upper opening in the pressure vessel. A core, having an axial dimension, is supported within the pressure vessel. A plurality of nuclear fuel assemblies are supported within the core with at least some of the fuel assemblies having at least one instrumentation thimble extending axially therethrough. An upper internals assembly is supported above the core and has axially extending instrumentation guide paths supported therethrough with each of the instrumentation thimbles that are configured to receive instrumentation through the upper internals assembly being aligned with one of the instrumentation guide paths. The upper internals further include an instrumentation grid assembly plate supported above the instrumentation guide paths and axially moveable relative to a lower portion of the upper internals. At least two in-core instrumentation thimble assemblies are provided that respectively extend through a corresponding one of the instrumentation guide paths into a corresponding one of the instrumentation thimbles and is retractable into the upper internals assembly when the instrumentation grid assembly plate is raised. Each of the in-core instrumentation thimble assemblies has a signal output lead that is routed within the vicinity of the instrumentation grid plate to and through a penetration flange that fits between the removable head and the pressure vessel. An electrical connector connects each of the signal output leads from the at least two in-core instrumentation assemblies to an output cable that extends through the penetration flange to the exterior of the pressure vessel. The method includes the steps of removing the head of the pressure vessel, lowering the water level in the pressure vessel below the penetration flange and the electrical connector before disconnecting the electrical connector which simultaneously disconnects each of the signal output leads associated with the at least two in-core instrumentation thimble assemblies, from the penetration flange. The instrumentation grid assembly plate is then raised until the instrumentation thimble assemblies are above the core. The upper internals assembly is then removed and the core is exposed for refueling.

In one embodiment disconnecting the electrical connector simultaneously disconnects all of the instrumentation thimble assemblies from the penetration flange. Preferably the method includes the step of shielding the instrumentation thimble assemblies as the instrumentation thimble assemblies are raised out of the core. It is also preferable for the method to include the step of sealing an open end of the electrical connector when it is disconnected, to prevent exposure of electrical leads to water.

In another embodiment the in-core instrumentation thimble assemblies are attached to the instrumentation grid assembly plate and preferably the guide paths include a telescoping sleeve that is attached to the instrumentation grid assembly plate and is extended when the instrumentation grid assembly plate is raised.

BRIEF DESCRIPTION OF THE DRAWINGS

A further understanding of the invention can be gained from the following description of the preferred embodiments when read in conjunction with the accompanying drawings in which:

FIG. 8 is a schematic diagram illustrating a portion of the reactor vessel and upper internals with the in-core instrumentation thimble assemblies fully inserted within the core and the signal output leads connected to the cabling extending through the penetration flange;

FIG. 9 shows the right portion of the schematic illustration shown in FIG. 8 with the reactor head removed and the water lowered below the level of the electrical connectors;

DESCRIPTION OF THE PREFERRED EMBODIMENT

Figure 1:
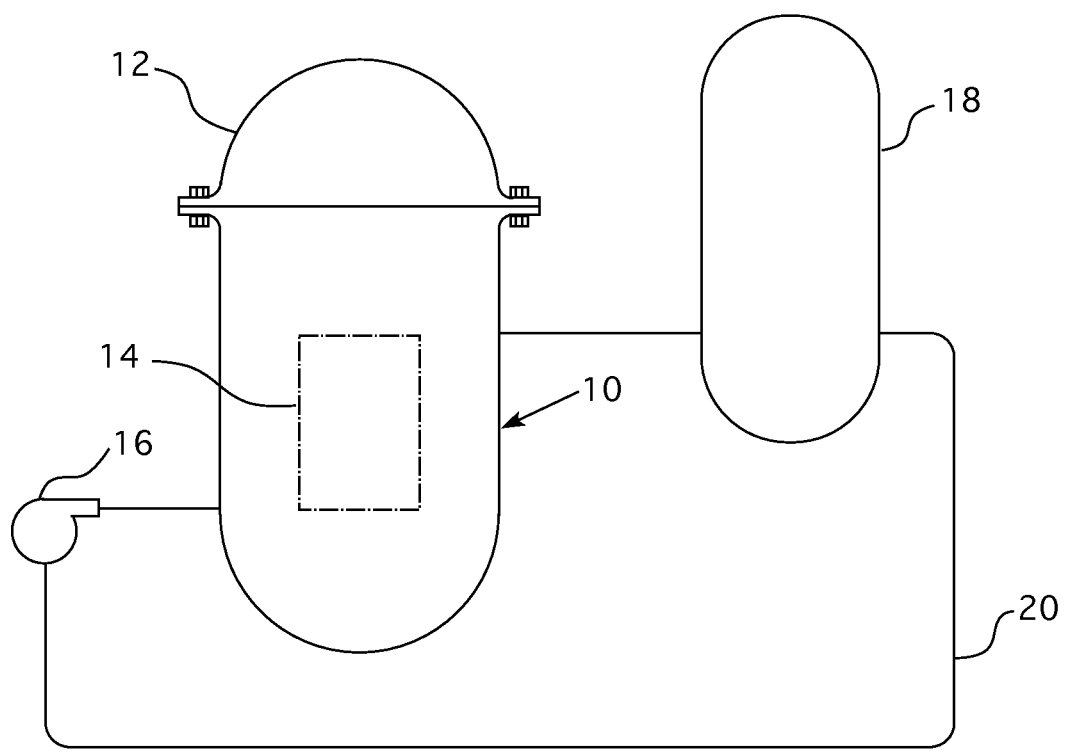
FIG. 1 is a simplified schematic of a nuclear reactor to which this invention can be applied.

Referring now to the drawings, FIG. 1 shows a simplified nuclear reactor primary system, including a generally cylindrical pressure vessel 10 having a closure head 12 enclosing a nuclear core 14. A liquid reactor coolant, such as water, is pumped into the vessel 10 by pump 16 through the core 14 where heat energy is absorbed and is discharged through a heat exchanger 18, typically referred to as a steam generator, in which heat is transferred to a utilization circuit (not shown) such as a steam driven turbine generator. The reactor coolant is then returned through pump 16, completing the primary loop. Typically, a plurality of the above-described loops are connected to a sealed reactor vessel 10 by reactor coolant piping 20.

Figure 2:
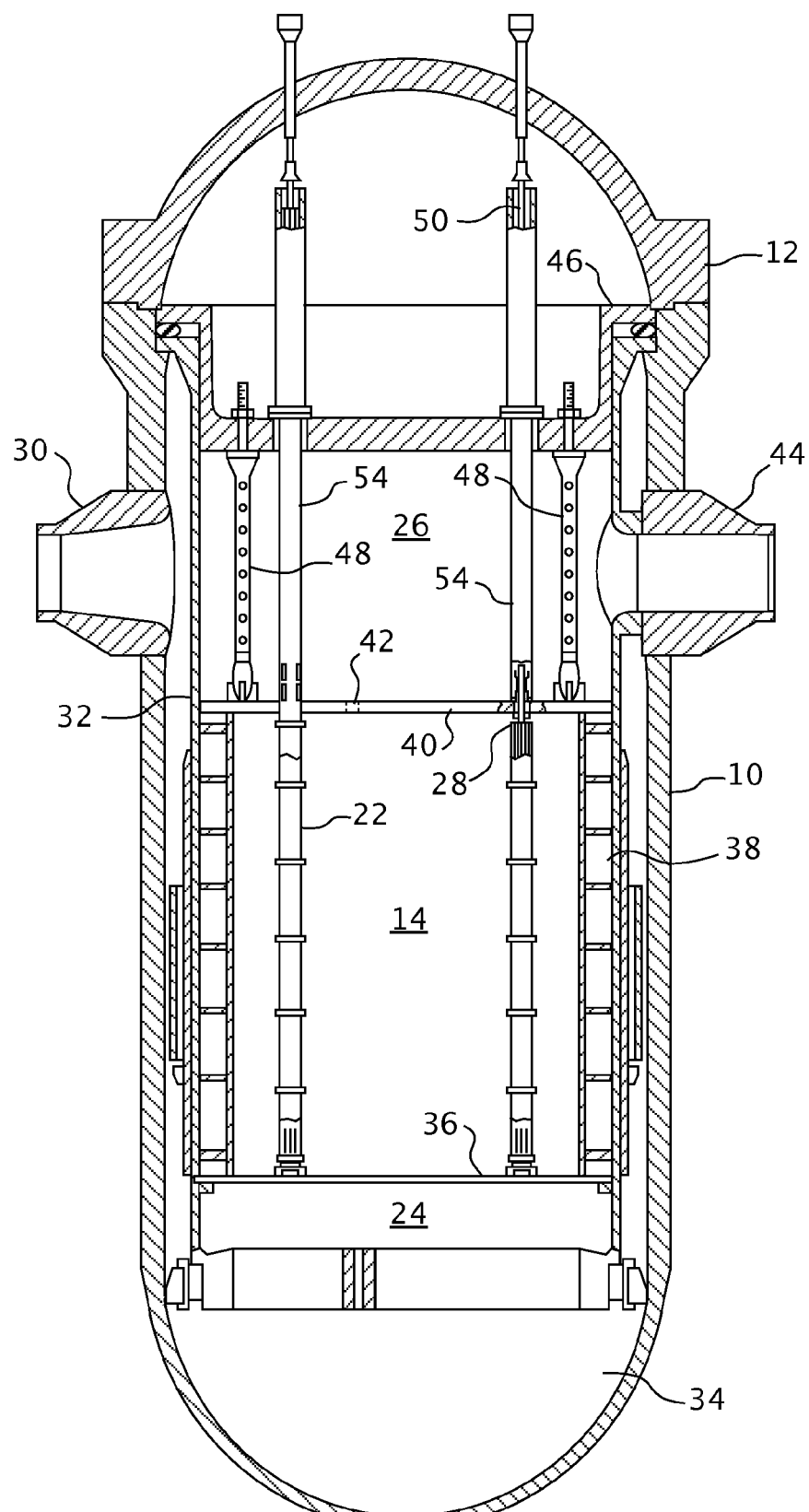
FIG. 2 is an elevational view, partially in section, of a conventional pressurized water reactor vessel and internal components to which this invention can be applied.

A conventional reactor design is shown in more detail in FIG. 2. As previously mentioned, though not shown in FIG. 2, in older conventional pressurized water reactor designs, the moveable or stationary in-core neutron detectors enter the core from the bottom of the reactor through tubes that extend from penetrations in the vessel bottom to the lower core plate 36 where they mate with the instrumentation thimbles within the fuel assemblies. Furthermore, in such a traditional reactor design, thermocouples that measure core temperature enter the upper head 12 through a single penetration and are distributed by a yoke or cable conduit, such as shown in U.S. Pat. No. 3,827,935 to individual support columns 48 and thereby to various fuel assemblies.

In addition to the core 14, comprised of a plurality of parallel, vertical co-extending fuel assemblies 22, for purposes of this description, the other vessel internal structures can be divided into the lower internals 24 and the upper internals 26. In conventional designs, the lower internals function to support, align and guide core components and instrumentation, as well as direct coolant flow within the vessel. The upper internals restrain or provide a secondary restraint for fuel assemblies 22 (only two of which are shown for simplicity), and support and guide instrumentation and components such as control rods 28.

In the exemplary reactor shown in FIG. 2, coolant enters the reactor vessel 10 through one or more inlet nozzles 30, flows downward about a core barrel 32, is turned 180° in a lower plenum 34, passes upwardly through a lower core support plate 36 upon which the fuel assemblies 22 are seated, and through and about the assemblies. The coolant flow through the core and surrounding area 38 is typically large. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially through one or more outlet nozzles 44.

The upper internals 26 can be supported from the reactor vessel 10 or the vessel closure head 12 and includes an upper support assembly 46 which is also referred to as the upper support plate. Loads are transmitted between the upper support plate 46 and the upper core plate 40 primarily by a plurality of support columns 48. A support column is aligned above a selected fuel assembly 22 and perforations 42 in the upper core plate 40 to provide access to elongated axial instrumentation thimbles centrally located within each fuel assembly with the instrumentation thimbles being co-extensive with the fuel assemblies' control rod guide thimbles.

Rectilinearly moveable control rods 28, typically including a drive shaft 50 and a spider assembly to which neutron absorbing rods are attached, are guided through the upper internals 26 and into aligned fuel assemblies 22 by control rod guide tubes 54. The guide tubes are fixedly joined to the upper support assembly 46 and connected by split pin force fed into the top of the upper core plate 40.

Figure 3:
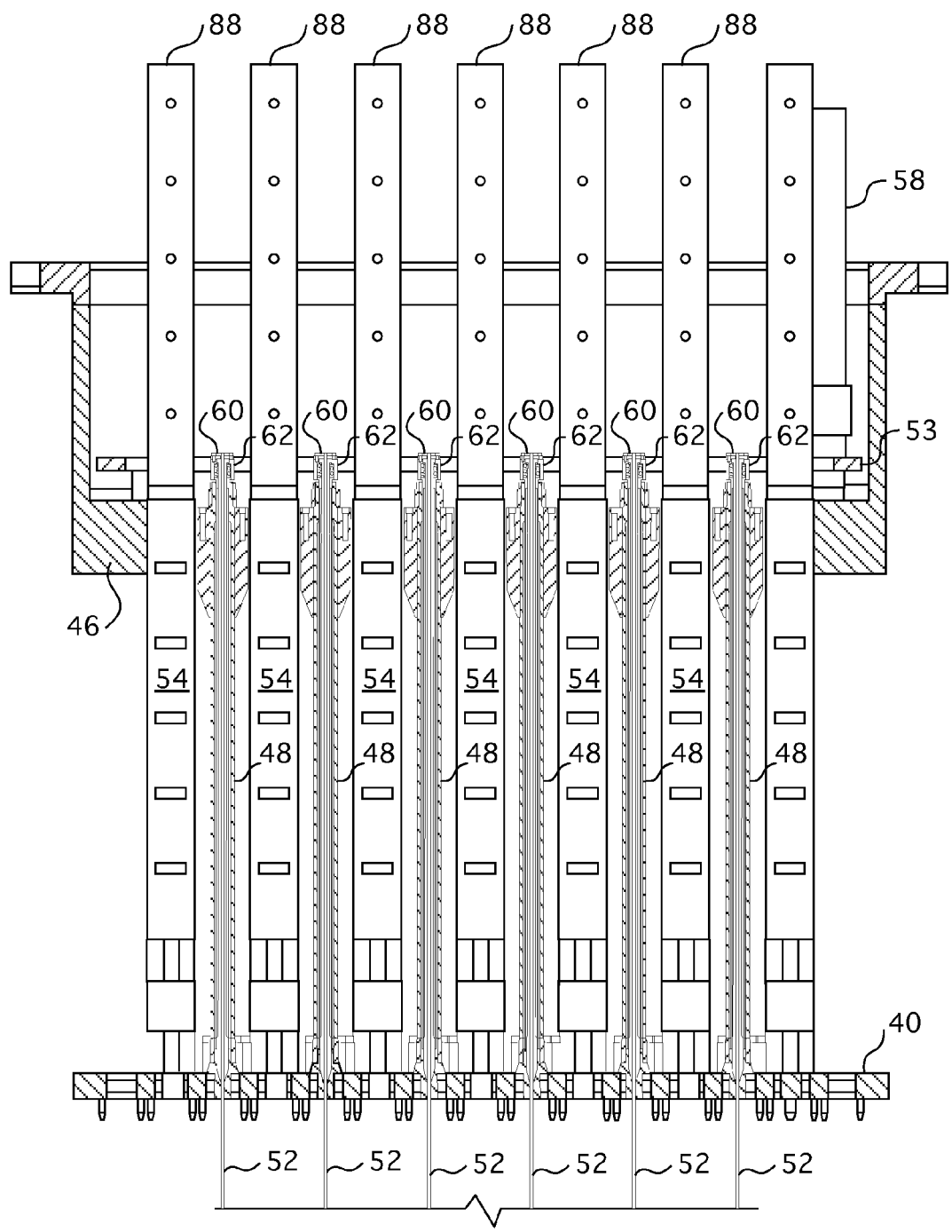
FIG. 3 is an elevational view, partially in section, of an upper internals package of one embodiment of a conventional pressurized water reactor showing the telescoping in-core instrumentation guide tubes, that can be employed with this invention, in a lowered position.

FIG. 3 provides an enlarged view of the upper internals package from which it can be clearly seen that the control rods, which extend from the head 12 through the upper internals package and into the core below the upper core plate 40, are guided substantially over the entire distance by the control rod guide tubes 54 and control rod guide tube extensions 88. However, the in-core instrumentation which are guided through the support columns 48 only receives support above the elevation of the reactor core between the upper core plate 40 and the upper support assembly 46. A substantial distance remains between the upper support assembly 46 and the head 12 over which the in-core instrumentation is exposed once it is withdrawn from the core.

Figure 4:
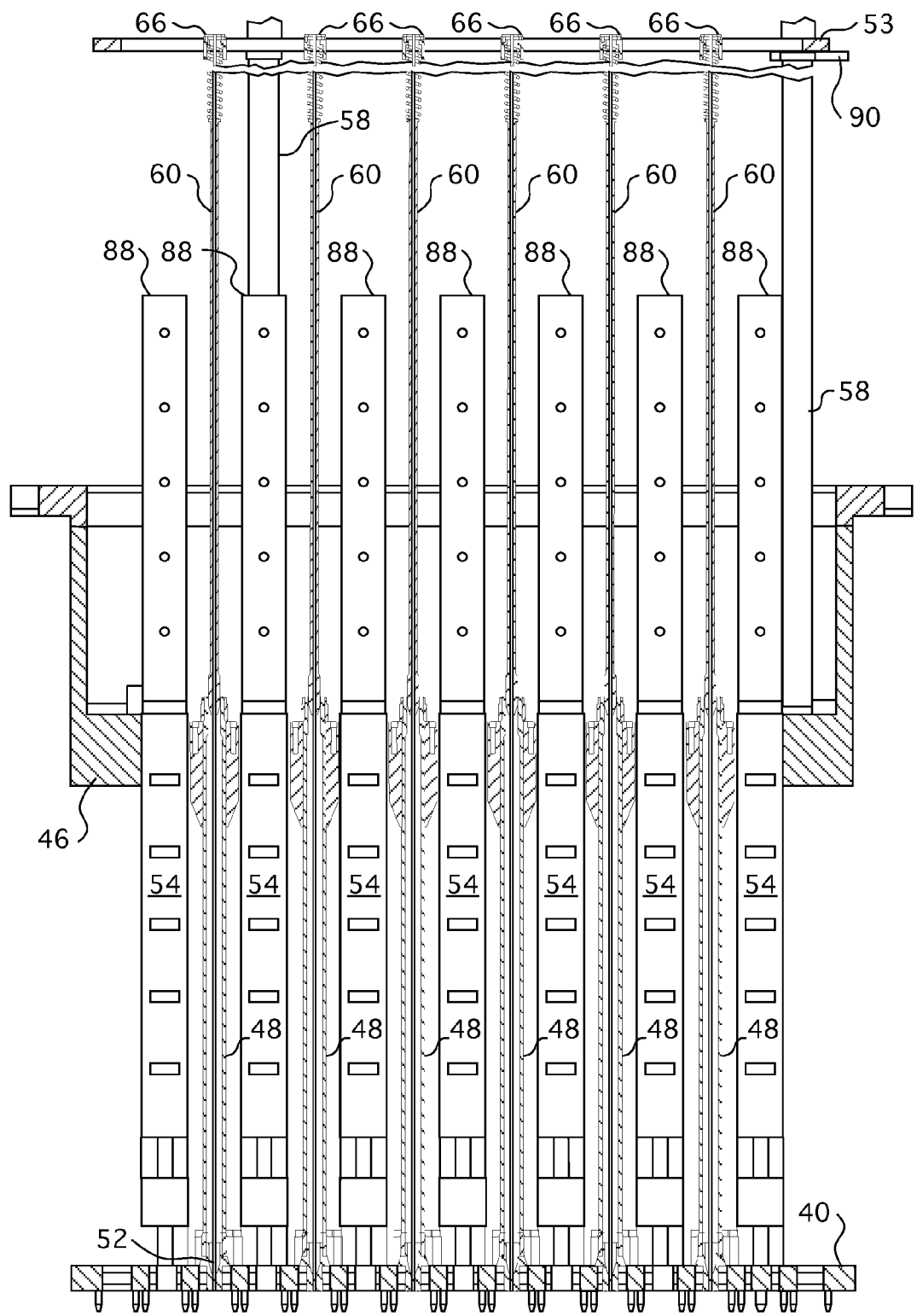
FIG. 4 is an elevational view, partially in section, of the upper internals package shown in FIG. 3 with the in-core telescoping instrumentation guide tubes in a raised position.

In the conventional embodiment shown in FIG. 3, some or all of the instrumentation is routed through one or more penetrations in the reactor head 12. This prior art embodiment provides a structural modification to earlier reactor models to provide support for the in-core instrument thimble assemblies 52 in their withdrawn position where they extend above the upper support plate 46. In this prior art embodiment, the support columns 48 are provided with a slidable or telescoping sleeve 60 that is extendable from the upper portion 62 of the support columns 48 into the area above the upper support plate 46 to support the in-core instrument thimble assemblies 52 when they are withdrawn from the fuel assemblies 22 to gain access to the core. In reactors such as the AP1000® supplied by Westinghouse Electric Company LLC, Cranberry Township, Pa., the length of withdrawal required to raise the in-core instrument thimble assemblies 52 to the mid plane of the upper core plate 40 is typically larger than the height of the support columns 48 which leaves the highly irradiated upper portion of the in-core instrument thimble assemblies 52 exposed above the upper support plate 46, unguided and potentially subject to damage. Typically, in the AP1000® design, the in-core instrument thimble assemblies 52 need to be raised. The slidable sleeves 60 are designed to extend to support the exposed area of the in-core instrument thimble assemblies 52 above the upper support plate 46. An instrumentation grid assembly plate 53 is attached to the upper ends of the slidable sleeve 60 and is guided by the pins 58 and fixed in an upper position by the swing clamp 90. FIG. 3 shows the instrument grid assembly 53 in its lower position and FIG. 4 shows the instrument grid assembly 53 in its upper position to raise the in-core instrument thimble assemblies out of the core. This prior art embodiment is more fully described in U.S. Patent Publication No. 2010/0150294, published Jun. 17, 2010.

Figure 5:
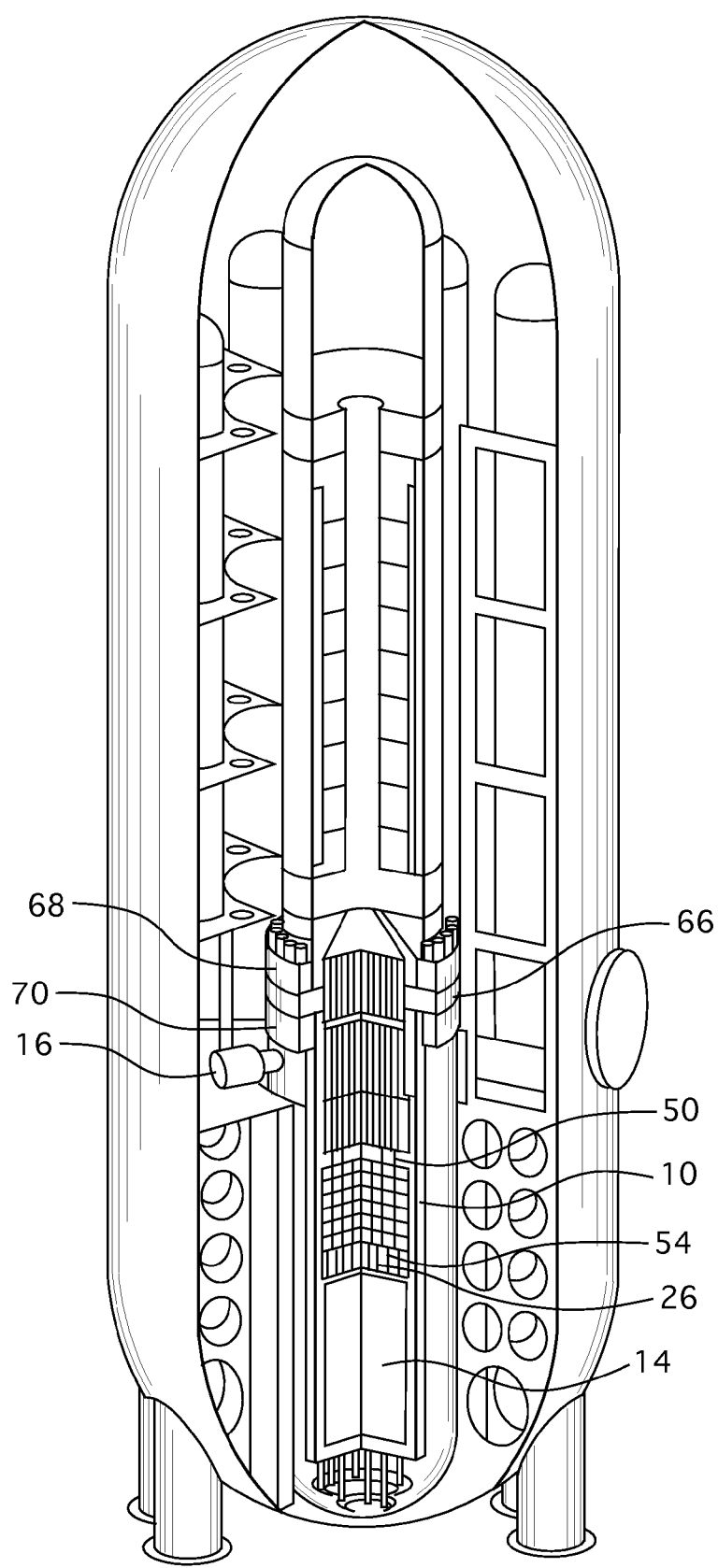
FIG. 5 is a perspective view partially cut away, showing a small modular reactor system that can benefit from this invention.
Figure 6:
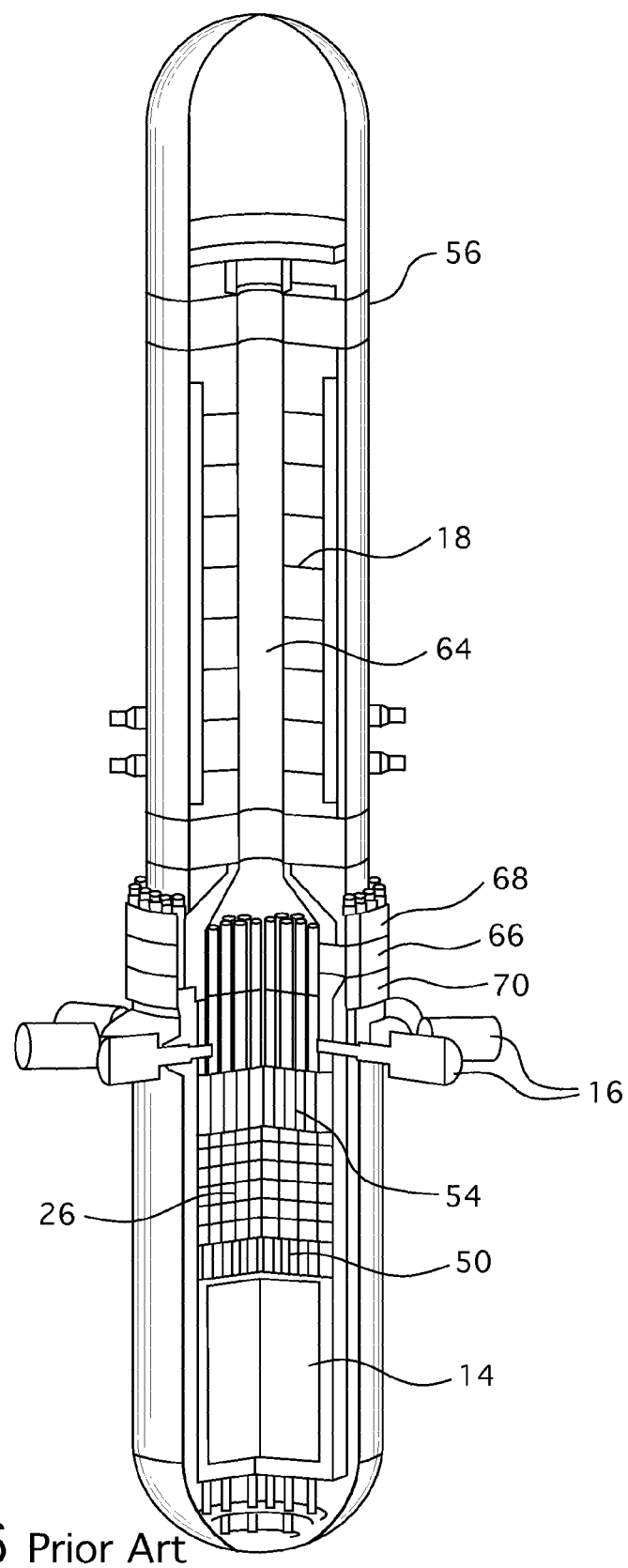
FIG. 6 is an enlarged view of the reactor shown in FIG. 5.

FIGS. 5 and 6 illustrate a schematic of a small modular reactor which is more fully described in U.S. patent application Ser. No. 13/457,683, filed Apr. 27, 2012, entitled "Instrumentation and Control Penetration Flange for Pressurized Water Reactor." FIG. 5 shows a perspective view, partially cut away, to show the pressure vessel and its internal components. FIG. 6 is an enlarged view of the pressure vessel shown in FIG. 5. A pressurizer 56 of which usually one is included in each pressurized water nuclear reactor system, regardless of the number of loops, though not shown in FIG. 1, for maintaining the pressure in the system, is integrated into the upper portion of the reactor vessel head in the integral, modular reactor shown in FIGS. 5 and 6 and eliminates the need for a separate component. It should be appreciated that the same reference characters are employed for corresponding components among the several figures. A hot leg riser 64 directs primary coolant from the core 14 to a steam generator 18 which surrounds the hot leg riser 64. A number of coolant pumps 16 are circumferentially spaced around the reactor vessel 10 at an elevation near the upper end of the upper internals 26. The reactor coolant pumps 16 are horizontally mounted axial flow canned motor pumps. The reactor core 14 and the upper internals 26, except for their size, are substantially the same as the corresponding components previously described with regards to FIGS. 1 and 2. From the foregoing, it should be apparent that the traditional means for routing the cabling from the upper internal components to the exterior of the reactor cannot readily be employed. Some small modular reactor designs also require electrical power to be supplied to internal components such as control rod drive mechanisms, reactor coolant pumps, and pressurizer heaters. U.S. patent application Ser. No. 13/457,683, filed Apr. 27, 2012, entitled, "Instrumentation and Control Penetration Flange for Pressurized Water Reactor" describes an alternative location for all reactor penetrations, including electrical power, through a ring 66 that is clamped between the upper and lower reactor vessel closure flanges 68 and 70, respectively (FIGS. 5 and 6). The penetration flange 66, which is inserted between the reactor head flange 68 and the reactor vessel flange 70, provides a convenient means of reactor vessel disassembly and reassembly during plant refueling operations and allows for inspection and maintenance of the in-vessel components. In the following description, the preferred embodiment of the invention claimed hereafter will be described in the context of a specific small integral reactor design, however, it should be recognized that the novel elements of this invention can be applied to other reactors, including conventional pressurized water reactors whether or not they have similar design restrictions.

Figure 7:
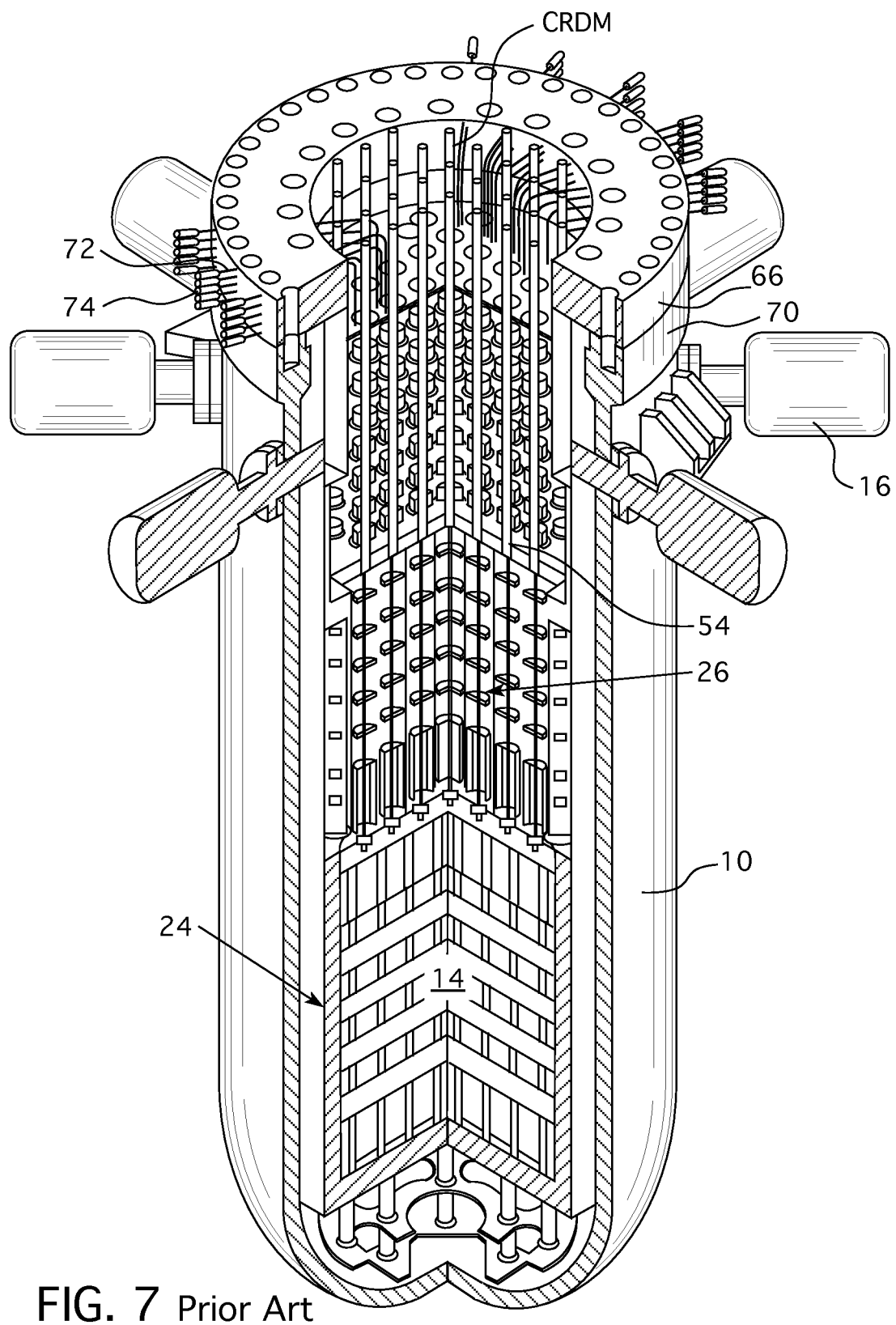
FIG. 7 is a perspective view of the reactor vessel and its internal components shown in FIGS. 5 and 6, with a portion cut away to show the internals.

FIG. 7 shows a reactor vessel 10 and its internal components, including the lower internals 24, that includes the core 14, and upper internals 26, that includes the control rod guide tubes 54, the drive rod housings and the control rod drive mechanisms (CRDM). The annular penetration flange seal 66 has radially extending ports 72 through which utility conduits 74 transport electrical power, instrumentation signals, control signals or hydraulic fluids to or from the interior of the pressure vessel to the exterior thereof. The signal cabling from the in-core instrumentation in the preferred embodiments of this invention would be conveyed through these utility conduits. While the arrangement of axial and radial penetrations through the flange 66 will be a function of the requirements of a particular reactor design, in the small modular reactor internals design described in the afore cited patent application Ser. No. 13/457,683, axial passages are positioned towards the inner diameter of the penetration seal ring 66 to allow return coolant flow from the steam generator 18 to pass through the penetration 66. The operation of the small modular integral reactor described herein can be better understood by reference to co-pending U.S. patent application Ser. No. 13/495,050, filed Jun. 13, 2012, entitled "Pressurized Water Reactor Compact Steam Generator."

This invention provides a modification to the in-core instrument thimble assemblies that typically monitor core power and core coolant exit temperature. This modification reduces the number of underwater electrical cabling disconnects and reconnects that need to be performed during a refueling operation; a procedure that is difficult and time consuming. One embodiment of this invention is illustrated in FIG. 8 and takes advantage of an electrical connector 78 that couples the electrical signal output leads 80 from two or more in-core instrument thimble assemblies 52 (two being shown in the FIG. 8) with a permanently installed cable 82 protected by a thimble tube that is attached to the penetration flange 66. Each of the in-core instrumentation thimble assemblies 52 are connected to an instrument thimble assembly grid plate 53 at their upper end and is supported above the upper support plate 46, between the upper support plate and the rod travel housing support plate 86, through a support column extension 84 and between the upper core plate 40 and the upper support plate 46 through the support columns 48. Below the upper core plate 40 the in-core instrumentation thimble assemblies 52 enter the instrumentation thimbles within the fuel assemblies 22. FIG. 8 shows the reactor head 12 and instrumentation flange 66 secured to the reactor vessel flange 70 with a closure stud 76, symbolizing the starting point for refueling after the reactor has been shut down. The instrument thimble assembly grid plate 53 is in the lower position resting on the penetration flange 66, with the in-core instrumentation thimble assemblies 52 fully inserted within the core 14. In this embodiment, the penetration flange 66 is an integral part of the upper internals assembly 26.

Figure 10:
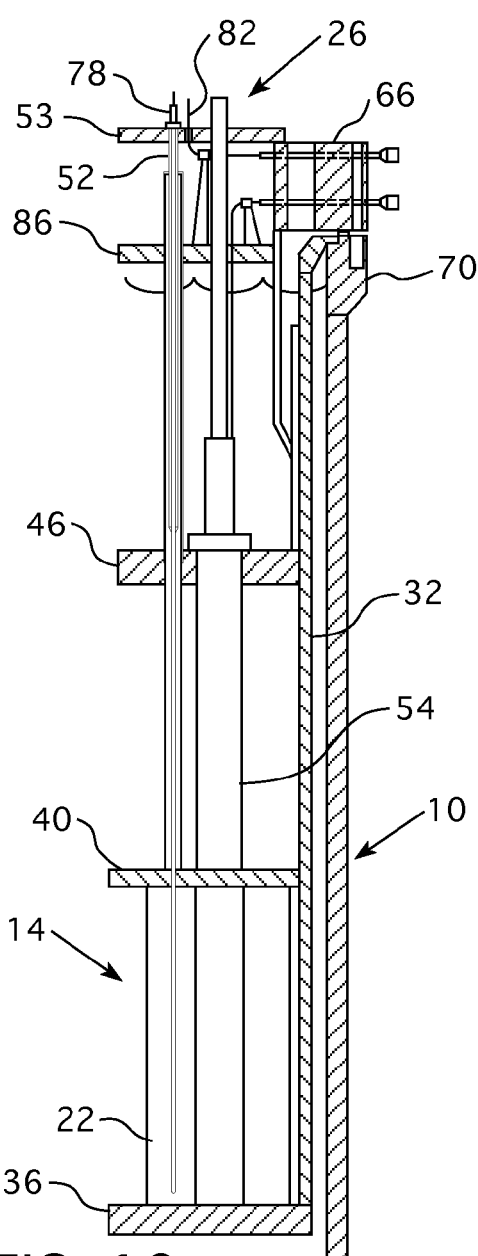
FIG. 10 shows the schematic illustration in FIG. 9 with the in-core instrumentation thimble assembly electrical connector removed.
Figure 11:
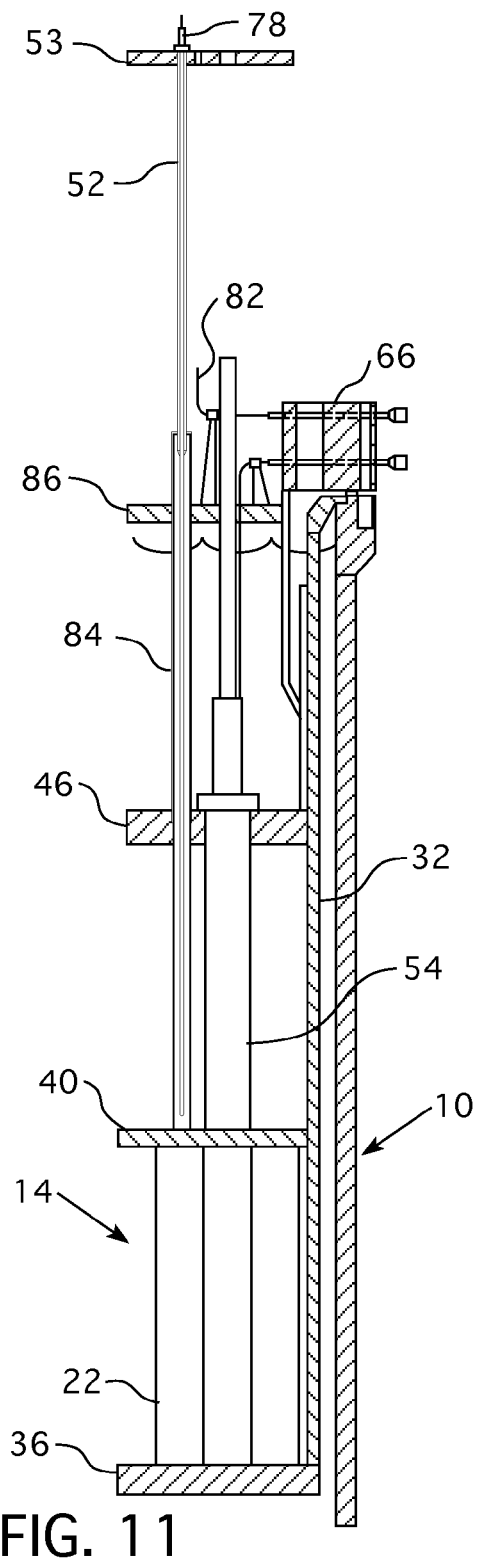
FIG. 11 shows the schematic shown in FIG. 10 with the instrumentation grid assembly plate raised to remove the in-core instrumentation thimble assemblies from the core.
Figure 12:
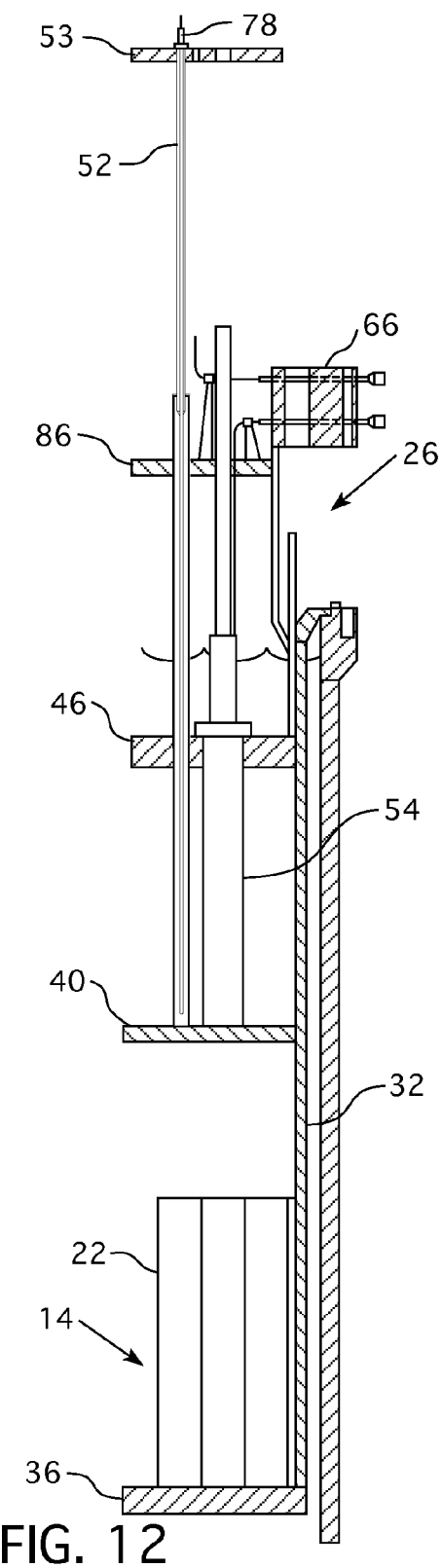
FIG. 12 is the schematic illustration shown in FIG. 11 with the upper internals assembly being removed from the core together with the in-core instrumentation.
Figure 13:
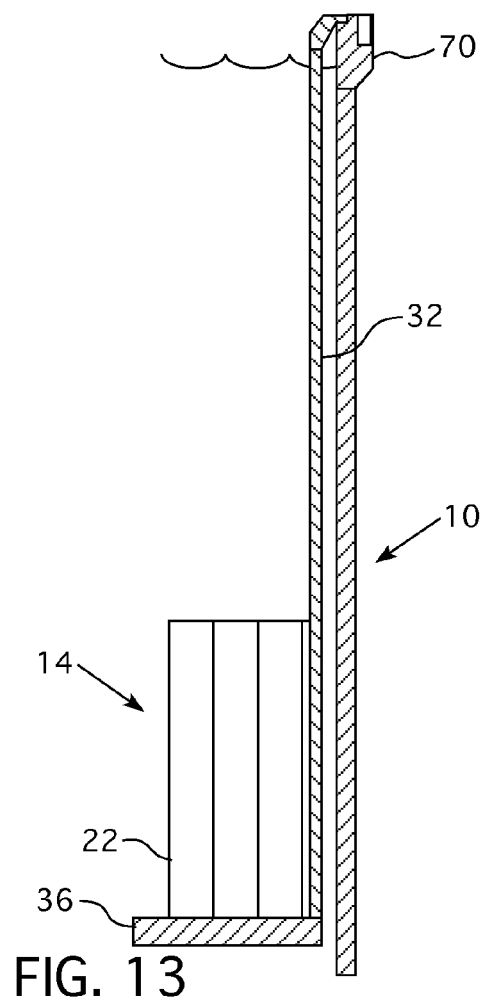
FIG. 13 is the schematic illustration shown in FIG. 12 with the upper internals assembly completely removed from the reactor vessel.

FIGS. 9-13 show, in accordance with this invention, one embodiment of a reactor upper internals disassembly sequence to access the fuel assemblies for refueling. In FIG. 9, the closure studs 76 have been removed along with the head 12 containing the steam generator 18, exposing the upper internals 26. At this point, the water level 92 within the reactor vessel 10 is lowered below the electrical connectors 78 and, preferably, below the penetration flange 66. In FIG. 10, the electrical connector 78 is disconnected, separating the signal leads 80, from the several in-core instrumentation thimble assemblies 52, from the cable 82 that is connected to the penetration flange 66. Two or more and, preferably, substantially all of the in-core instrumentation thimble assemblies are disconnected from the cable 82 simultaneously greatly simplifying the operation. FIG. 11 shows the instrument thimble assembly grid plate 53 being raised, retracting the in-core instrumentation thimble assemblies 52 from the core 14. Then the entire upper internals assembly 26 is removed with the instrumentation flange 66 as shown in FIG. 12, exposing the core for refueling as shown in FIG. 13.

While the plant is operating, the in-core instruments are subject to a very high radiation field and become highly activated. If required, the support columns can be thickened to provide shielding and shielding can be introduced to the other structures of the upper internals. In addition, a lifting rig such as the one described in U.S. patent application Ser. No. 13/741,737, filed Jan. 15, 2013, entitled "Apparatus and Method for Removing the Upper Internals From a Nuclear Reactor Pressurized Vessel," may be employed to lift the upper internals with a minimum of exposure.

As mentioned, the signal cables 80 of several of the in-core instrumentation thimble assemblies 52 are brought together into one larger sleeved cable 82 through the electrical connector 78, to minimize the number of penetration flange/in-core instrumentation thimble assembly connectors and penetrations that are necessary. The in-core instrumentation thimble assemblies are protected against buckling during upper internals lowering into the reactor vessel by the in-core instrumentation thimble assembly guide column 60 which is attached to the instrument thimble assembly grid plate 53 and telescopes within the support column extension 84. Lifting and lowering of the instrument thimble assembly grid plate also lifts and lowers the in-core instrumentation thimble assembly and the guide column that surrounds it. Thus, the in-core instrument thimble assembly guide column travels inside the support column extensions 84 which is supported by the upper support plate 46 and the rod travel housing support plate 86. The electrical connector 78 which is disconnected should have its exposed end sealed with temporary caps to avoid damage during removal and reinsertion of the upper internals.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of refueling a pressurized water nuclear reactor having a pressure vessel; an upper removable head for sealably engaging an upper opening in the pressure vessel; a core having an axial dimension supported within the pressure vessel; a plurality of nuclear fuel assemblies supported within the core, at least two of the fuel assemblies having at least one instrumentation thimble extending axially therethrough; an upper internals assembly supported above the core and having axially extending instrumentation guide paths supported therethrough with each of the instrumentation thimbles that are configured to receive instrumentation through the upper internals assembly being aligned with one of the instrumentation guide paths; the upper internals assembly including an instrumentation grid assembly plate supported above and axially movable relative to a lower portion of the upper internals; at least two in-core instrumentation thimble assemblies respectively extending through a corresponding one of the instrumentation guide paths into a corresponding one of the instrumentation thimbles and retractable into the upper internals assembly when the instrumentation grid assembly plate is raised; each of the in-core instrumentation thimble assemblies having a signal output lead that is routed within the vicinity of the instrumentation grid plate to and through a penetration flange that fits between the removable head and the pressure vessel; and an electrical connector that connects each of the signal output leads from the at least two in-core instrumentation assemblies to an output cable that extends through the penetration flange to the exterior of the pressure vessel, the method comprising the steps of:

lowering a water level in the pressure vessel below the penetration flange and the electrical connector;

removing the upper removable head from the penetration flange;

disconnecting the electrical connector which simultaneously disconnects each of the signal output leads associated with the at least two in-core instrumentation thimble assemblies from the penetration flange;

axially raising the instrumentation grid assembly plate until the instrumentation thimble assemblies are above the core;

exposing the core by removing the upper internals assembly; and refueling the core.

2. The method of claim 1 wherein the disconnecting step simultaneously disconnects all of the instrumentation thimble assemblies from the penetration flange by disconnecting the electrical connector.

3. The method of claim 1 including the step of shielding the instrumentation thimble assemblies as the instrumentation thimble assemblies are raised out of the core.

4. The method of claim 1 including the step of sealing an open end of the electrical connector.

5. The method of claim 1 wherein the in-core instrumentation thimble assemblies are attached to the instrumentation grid assembly plate.

6. The method of claim 1 wherein the instrumentation guide paths include a telescoping sleeve that is attached to the instrumentation grid assembly plate and the raising step extends the telescoping sleeve.

7. The method of claim 1 wherein the head is removed before the water is lowered below the penetration flange and the electrical connector.

* * * * *